E. E. Cole.
Pile Driver.
N° 3,737.    Patented Sep. 14, 1844.
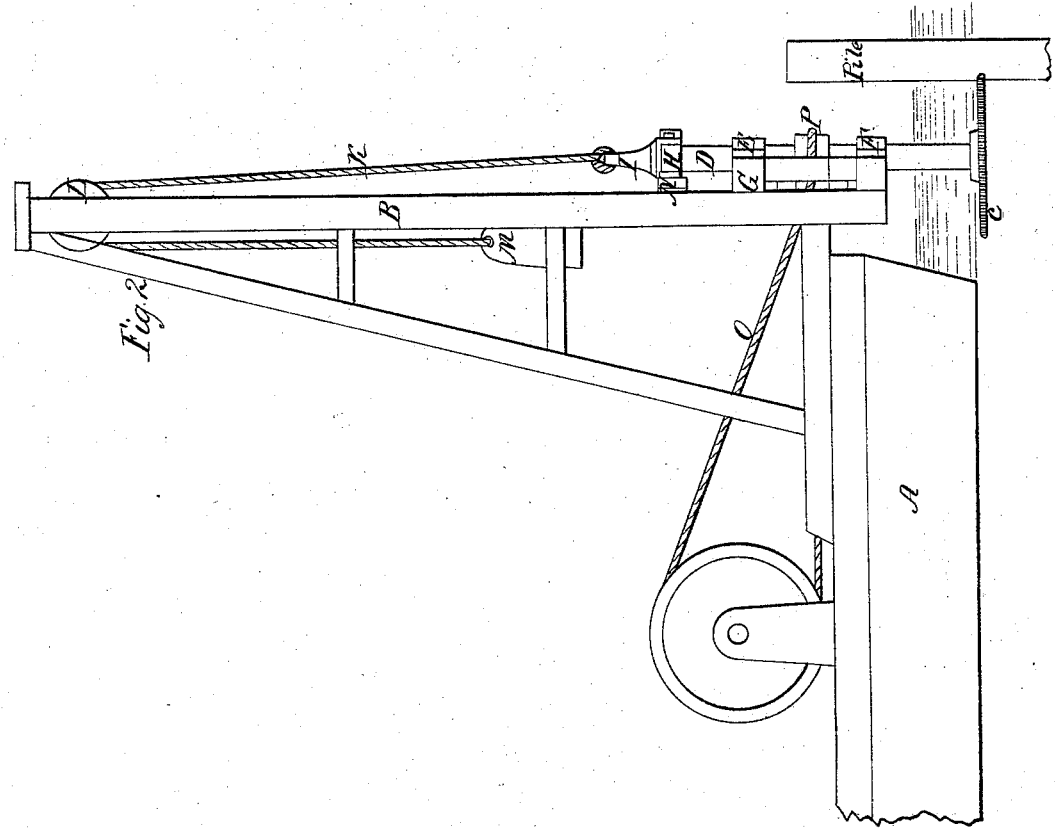
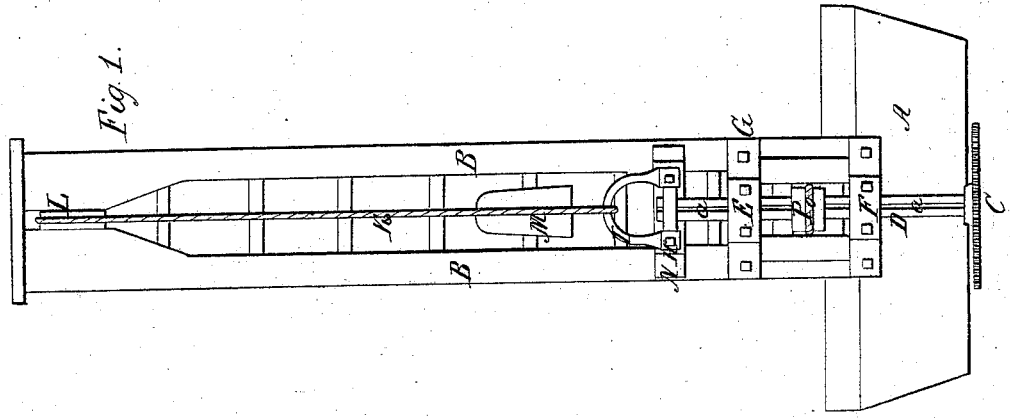

UNITED STATES PATENT OFFICE.

ERASTUS E. COLE, OF BOSTON, MASSACHUSETTS.

METHOD OF APPLYING CIRCULAR SAWS FOR CUTTING OFF PILES UNDER WATER.

Specification of Letters Patent No. 3,737, dated September 14, 1844.

*To all whom it may concern:*

Be it known that I, ERASTUS E. COLE, of Boston, in the county of Suffolk and State of Massachusetts, have invented a mode of adapting a circular saw to a vessel or scow so as to enable the said saw during the motions of the vessel upon the water, caused by the waves, to cut off piles to any required depth below the surface of the water, and that the following description and accompanying drawings taken together constitute a full and exact specification of the construction and operation of my improvement.

For the purpose of laying the foundations of walls or other structures in deep water and beneath the level of low water mark, where the said walls rest on piles driven into the bottom of the harbor or river, as the case may be, it has been customary to cut off the piles by means of an ordinary saw, or some other contrivance, and to do the same at a distance beneath the surface of the water beyond what a workman could reach with his arm a diving bell has usually been employed. It has been considered that a circular saw applied to and supported by a scow or vessel, could not be made to operate successfully on account of the constant undulatory motion of the vessel caused by wind or the waves—and therefore the application of a circular saw to a vessel for the purpose of cutting off piles has never before to my knowledge been successfully made. By my mode of adapting and governing the saw I can cut off a pile or a series of piles to any required depth below the surface of the water, with ease, certainty and dispatch.

Figure 1 of the above mentioned drawings represents an elevation of the bow and gins of a pile driving vessel or scow, and Fig. 2 is a side elevation of the scow and gins, the manner of arranging and adapting the saw being exhibited in the said figures.

A (Figs. 1 and 2) is the scow or batteau and B, B, the vertical gins within which the pile driving hammer is usually placed and operates. The circular saw is seen at C, and is attached to the lower end of a vertical shaft D, which is sustained in position by two bearings or boxes E, F, bolted to a rectangular frame G, properly secured to the front sides of the lower part of the gins; as seen in the drawings. The shaft D, is turned cylindrical and otherwise arranged in the boxes E, F, so as to be moved freely through the same, or up and down in a vertical direction. The head or upper end of the shaft travels on, and is sustained by a bearing H, that is to say the bearing is so fixed upon the shaft as to sustain the shaft at any desired elevation, and at the same time allow it to turn around horizontally, to impart a horizontal movement to the circular saw. A shackle I, is attached to the bearing H, for the purpose of receiving one end of a chain, or rope, K, which is secured thereto, and passes upward, and over a grooved sheave or pulley L, at the top of the gins, and thence downward and has a counterbalance weight M, suspended at its other end, as seen in Fig. 2, the said weight being for the purpose of balancing the saw, and its shaft, etc., depending from the rope. The bearing at the head of the shaft, is secured to a bent plate of metal N, which rests and moves against the front faces of the gins, the object of the same being to prevent the bearing from turning around with the shaft, and also to steady the upper end of the shaft. The shaft and saw, being thus arranged and adapted to the vessel, are put in revolution whenever necessary, by a band O, which proceeds from a suitable driving power, and passes around a pulley, or drum P, so arranged upon and applied to the vertical shaft, as to permit the shaft to move freely up and down through it, and at the same time, when driven to carry the shaft around with it. The mode by which I effect this is to cut a straight groove *a*, throughout the surface of the shaft, from the top to the bottom of the shaft. Into this groove a stud from the pulley projects, so that when the pulley is put in rotation it will carry the shaft around by means of the groove and projection. As this is well understood by mechanics I do not deem a further notice or representation necessary.

From the above it will be seen, that in order to cut off a pile, it only requires, the boat or scow should be floated into a convenient position for the saw to act upon the pile. The saw is then pressed or lowered down to the required depth underneath the surface of the water. This being effected, the shaft and saw are to be put in revolution and the vessel drawn gradually toward the pile, so as to bring the saw in contact with it, which, as soon as it has cut into the pile becomes fixed by the pile in its horizontal position although revolving. Now as the boat or scow is moved up and down, by the undulations or waves of the water, it will cause the boxes E, F, to move freely upon the shaft, the latter being kept in its position by the pile. Therefore the movement of the vessel caused by waves will not practically affect the operation of the saw, which, as the vessel is impelled forward will continue to cut into the pile until it separates the part thereof which is above the saw from the remainder of it or part beneath it.

In the use of my improvement I find it fully answers my expectations and proves very useful in preparing pile foundations.

I claim—

The sliding saw in combination with the scow or other floating body for the purpose as hereinbefore specified.

In testimony the foregoing is a correct specification of my said invention, I have hereto set my signature this sixth day of September in the year of our Lord one thousand eight hundred and forty-four.

ERASTUS E. COLE.

Witnesses:
R. H. EDDY,
WM. H. PLUMMER.